United States Patent
McGraw et al.

(10) Patent No.: US 10,940,780 B2
(45) Date of Patent: Mar. 9, 2021

(54) PERSONAL TRANSPORTATION VEHICLE WITH PIVOTING SEAT AND CARGO BAY

(71) Applicant: Club Car, LLC, Evans, GA (US)

(72) Inventors: Gregory Harris McGraw, Evans, GA (US); William David Reeves, Jr., Grovetown, GA (US); Joseph Mark Butler, Evans, GA (US)

(73) Assignee: CLUB CAR, LLC, Evans, GA (US)

( * ) Notice: Subject to any disclaimer, the term of this patent is extended or adjusted under 35 U.S.C. 154(b) by 247 days.

(21) Appl. No.: 15/872,678

(22) Filed: Jan. 16, 2018

(65) Prior Publication Data
US 2019/0217753 A1    Jul. 18, 2019

(51) Int. Cl.
| | |
|---|---|
| *B62D 33/08* | (2006.01) |
| *B60N 2/36* | (2006.01) |
| *B62D 39/00* | (2006.01) |
| *B60N 2/30* | (2006.01) |
| *B60N 2/10* | (2006.01) |
| *B60N 2/38* | (2006.01) |

(52) U.S. Cl.
CPC ............. *B60N 2/36* (2013.01); *B60N 2/10* (2013.01); *B60N 2/30* (2013.01); *B60N 2/38* (2013.01); *B62D 39/00* (2013.01)

(58) Field of Classification Search
CPC .... B60N 2/3013; B60N 2/305; B60N 2/3079; B60N 2/36; B60N 2002/363; B60P 3/423; B60R 22/24
USPC ............................ 280/756; 296/64, 68, 24.33
See application file for complete search history.

(56) References Cited

U.S. PATENT DOCUMENTS

| | | | |
|---|---|---|---|
| 6,065,798 A | 5/2000 | Sankrithi | |
| 6,481,772 B1 | 11/2002 | Tenn | |
| 6,517,135 B2 | 2/2003 | de Gaillard | |
| 7,429,078 B1 | 9/2008 | Tarlow et al. | |
| 8,075,040 B2* | 12/2011 | Arnold | B60N 2/3013 296/183.2 |
| 8,348,322 B2* | 1/2013 | King | B60P 3/423 296/183.2 |
| 8,353,534 B2* | 1/2013 | Arnold | B60N 2/3013 280/748 |
| 8,585,116 B2* | 11/2013 | King | B62D 33/03 296/24.33 |
| 9,932,143 B2* | 4/2018 | Henderson | B65D 11/1833 |
| 2004/0134946 A1* | 7/2004 | Gammon | B60R 7/02 224/275 |
| 2005/0236202 A1 | 10/2005 | Walworth | |
| 2014/0015273 A1* | 1/2014 | Sawada | B60N 2/3011 296/65.09 |
| 2018/0265010 A1* | 9/2018 | Line | B60N 2/22 |
| 2019/0106034 A1* | 4/2019 | Leon Guerrero | B60N 2/3045 |

\* cited by examiner

*Primary Examiner* — Toan C To
(74) *Attorney, Agent, or Firm* — Edell, Shapiro & Finnan, LLC

(57) ABSTRACT

The present disclosure is directed to a utility vehicle having a pivotable seat connected by a hinge to a fixed platform. The pivotable seat configured to pivot between a first position and a second position defining a standard seat location and a first wall of a cargo bay, respectively. A seatback is configured to form a second wall of a cargo bay when the pivotable seat is in the second position. First and second opposing side walls are positioned on either side of the pivotable seat. The side walls are configured to form barriers at either side of the cargo bay when the pivotable seat is in the second position.

15 Claims, 7 Drawing Sheets

PERSONAL TRANSPORTATION VEHICLE WITH PIVOTING SEAT AND CARGO BAY

TECHNICAL FIELD

The present application generally relates to a personal transportation vehicle and more particularly, but not exclusively, to a personal transportation vehicle with a pivoting seat configured to form a wall for a cargo bay.

BACKGROUND

Personal transport vehicles such as golf carts, all-terrain vehicles, utility vehicles or the like can include seating areas and separate cargo areas. Some existing vehicles have various shortcomings relative to certain applications. Accordingly, there remains a need for further contributions in this area of technology.

SUMMARY

One embodiment of the present disclosure is a unique pivoting seat arrangement for a personal transportation vehicle. Other embodiments include apparatuses, systems, devices, hardware, methods, and combinations for pivoting a seat to form a wall for a cargo bay. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
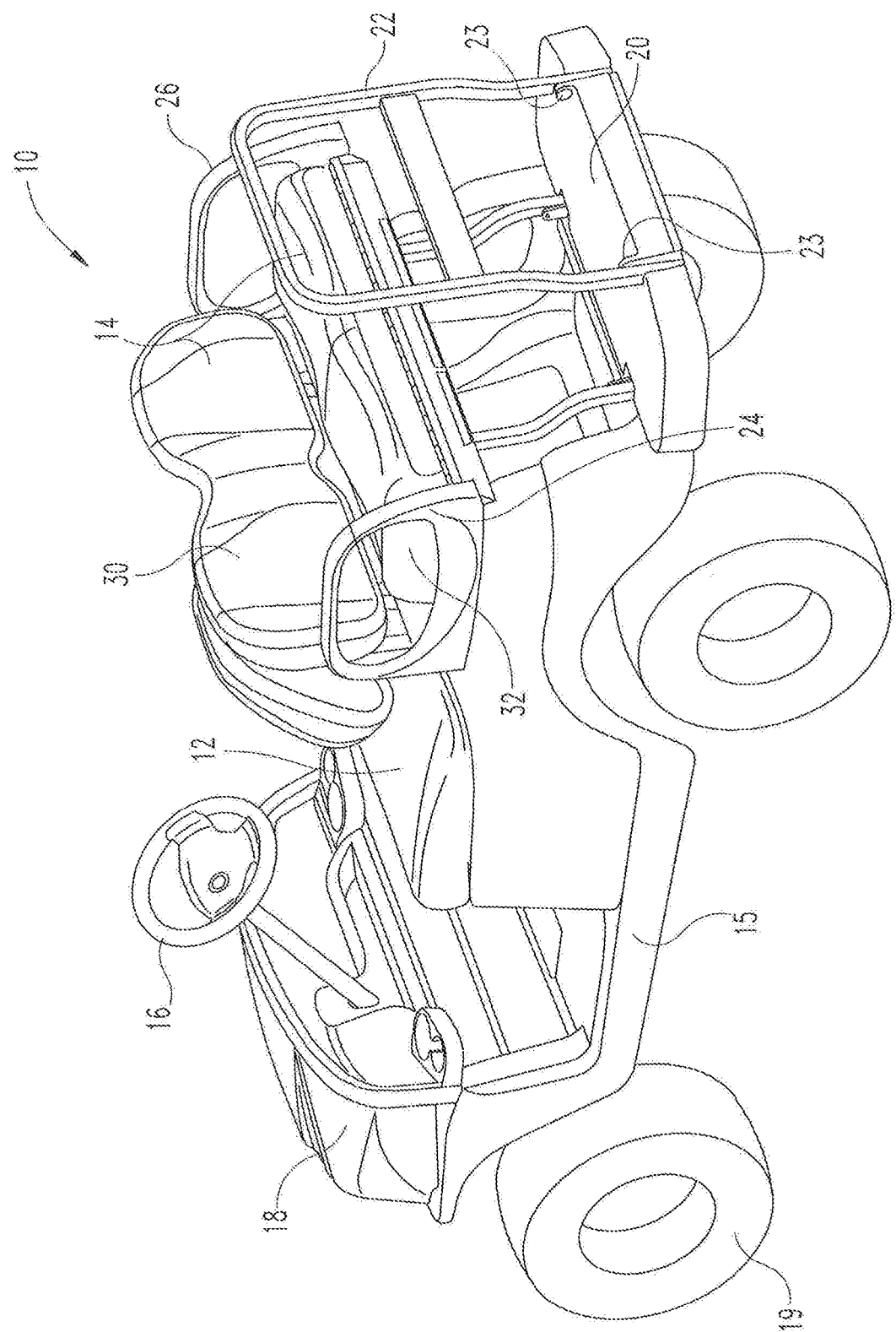
FIG. 1 is a perspective view of a personal utility vehicle having a movable seat configured to convert to a cargo bay according to one embodiment of the present disclosure.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Figure 2:
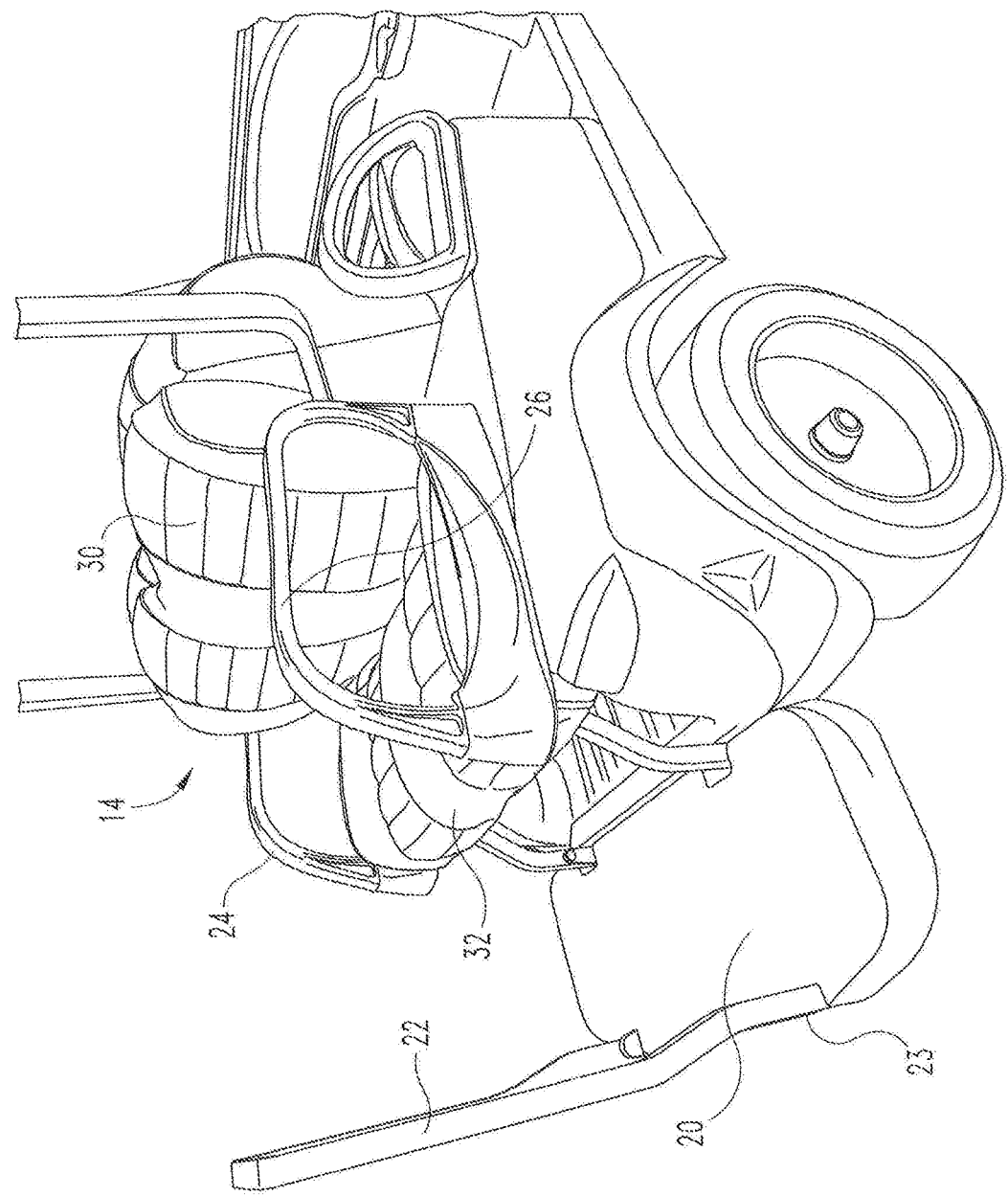
FIG. 2 is a partial perspective view of a portion of the personal utility vehicle of FIG. 1.

Referring now to FIGS. 1 and 2, perspective views of a personal utility vehicle or cart 10 are illustrated therein. The utility vehicle 10 can include a front seat 12 and rear seat 14 to carry one or more passengers as is customary. The utility cart 10 includes a chassis 15 with steering means 16, a motive source 18 such as a gas or electric motor and typically three or more wheels 19 capable of traversing over paved or unpaved terrain. The utility vehicle 10 may include a rear support floor 20 for holding items to be transported or for a foot rest or the like. A support rack or rail 22 may extend from the rear support floor 20 and may include means 23 for pivoting or otherwise permit movement of the support rail 22 relative to the rear support floor 20. The rear seat 14 can include a seat back 30 and a seat bottom 32 constructed with opposing side restraint walls or rails 24, 26 positioned at either side thereof. The first and second side restraint walls or rails 24, 26 are configured to prevent passengers from unintentionally moving or otherwise falling out of the side of the utility vehicle 10 when the utility vehicle 10 is moving around corners or the like.

Figure 3:
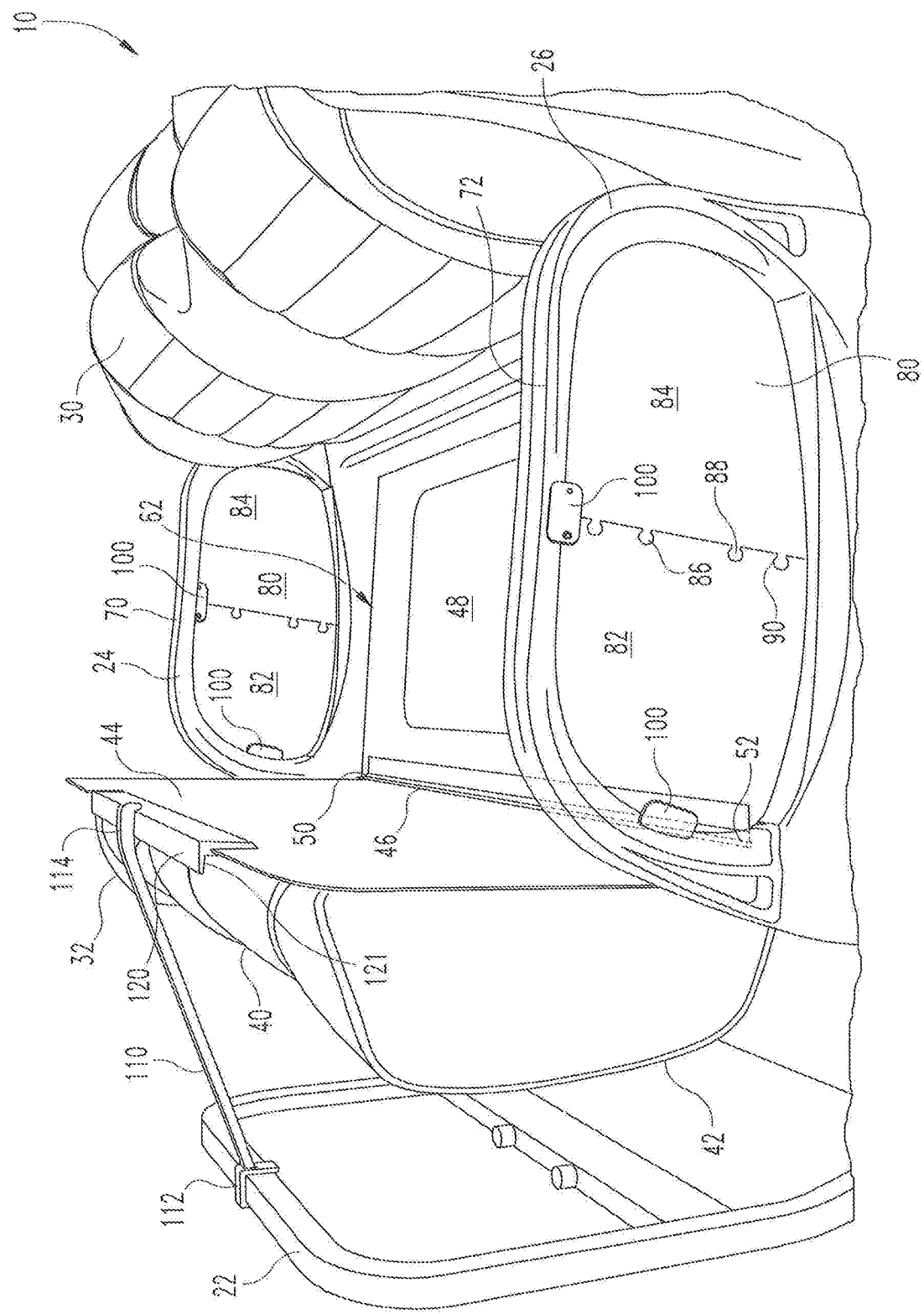
FIG. 3 is another perspective view of a portion of the personal utility vehicle of FIG. 1 with the seat in a second position to form a wall of a cargo bay.

Referring now to FIG. 3, a perspective view of a portion of the utility cart 10 is illustrated. A seat bottom 32 may include a first side 40 that includes a cushion 42 or other type of material for comfortable seating of a passenger during operation of the vehicle 10. The seat bottom 32 can include a second side 44 that can be formed from an impact resistance material such as plastic, metal or a composite material and the like. The seat bottom 32 is connected via a hinge 46 to a platform 48 positioned below the seat bottom 32 when the seat bottom 32 is in a first or conventional position. The seat bottom 32 may be pivoted about the hinge 46 when moved to an upright position away from the platform 48 in a second position. A cargo bay 62 is formed between the seat bottom 32 and the seat back 30 when the seat is moved to the second position. The hinge 46 can extend between a first end 50 and a second end 52 of the seat bottom 32 along the length of the platform 48. In this configuration, the cargo bay 62 is bound on one side of the seat bottom 32 and on the other side by the seat back 30. The cargo bay 62 is further bound at either end 50, 52 by the first side restraint wall 24 and the second side restraint wall 26.

In some forms, the first and second side restraint walls 24, 26 are configured to receive a side panel 80 positioned between an arm rest portion 70 and the platform 48. The panels 80 may substantially form a solid wall to prevent items from inadvertently being displaced from the cargo bay 62 along the sides thereof. In some embodiments, the panels 80 may include two or more sub-panels such as sub-panels 82, 84 that can be connected together by one or more connectors 86. In one form, the connectors 86 can be formed from a tongue 88 and groove 90 configuration extending from adjacent sub-panels 82, 84. The connectors 86 are operable to prevent relative movement between the sub-panels 82, 84. One or more securing brackets 100 may connect and removably hold the panels 80 to the side rails 24, 26.

In the exemplary embodiment, a positioning tool 110 may be utilized to hold the rear seat 32 in the second position. The positioning tool 110 includes a first connector 112 and a second connector 114 at opposite ends for connecting to the rear support rail 22 and a portion of the seat bottom 32 to hold the seat bottom 32 at a desired location away from the platform 48. In one form a seat connector bar 120 may be coupled to the seat bottom 32 to provide means for receiving the second connector 114 of the positioning tool 110. In one form the seat bottom 32 may be located in a substantially vertical position in the second position. In other forms the seat bottom 32 may be held in position that is greater than a 90° angle and in other embodiments the seat bottom 32 may be held in a position that is less than vertical or 90° relative to the platform 48. It should be understood that other means to hold the rear seat 32 in the second position are contemplated herein. By way of example and not limitation, locking pins, gears, propping bars, etc. may be utilized in alternate embodiments.

Figure 4:
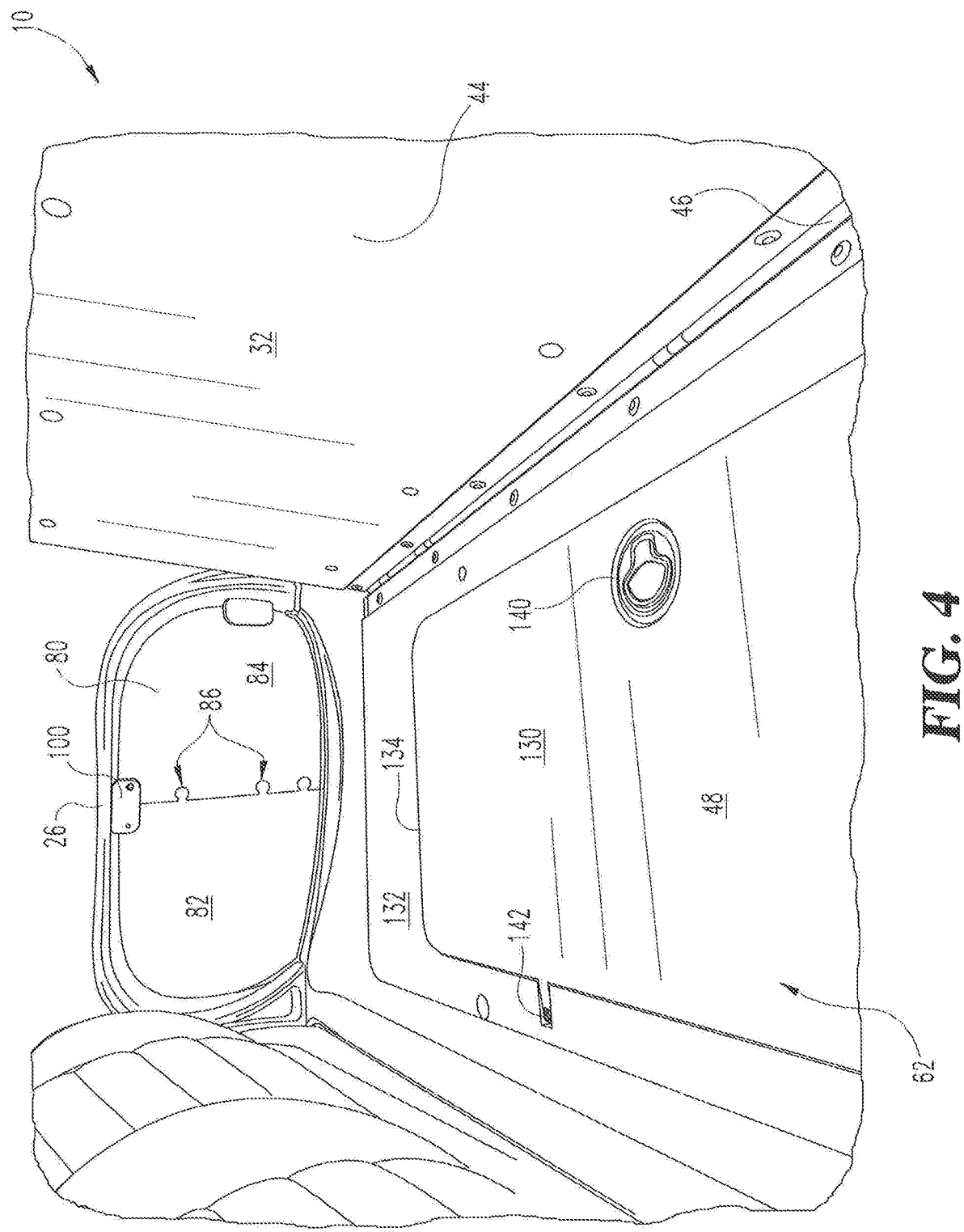
FIG. 4 is another perspective view of a portion of the personal utility vehicle of FIG. 3 including a movable portion of a platform of the cargo bay.

Referring now to FIG. 4, another view of a portion of the utility vehicle 10 is illustrated wherein the platform 48 of the cargo bay 62 includes a movable portion 130 bounded by an outer fixed portion 132 positioned around the movable portion 130. When the seat bottom 32 is positioned in the second position, a release handle 140 coupled to the movable portion 130 can be accessed and pulled upward so as to pivot the movable portion 130 about one or more platform hinges 142. The movable portion 130 may pivot relative to the fixed portion 132 to open and permit access to a lower cargo region (not shown). In this manner additional storage is accessible in the utility vehicle 10.

Figure 5:
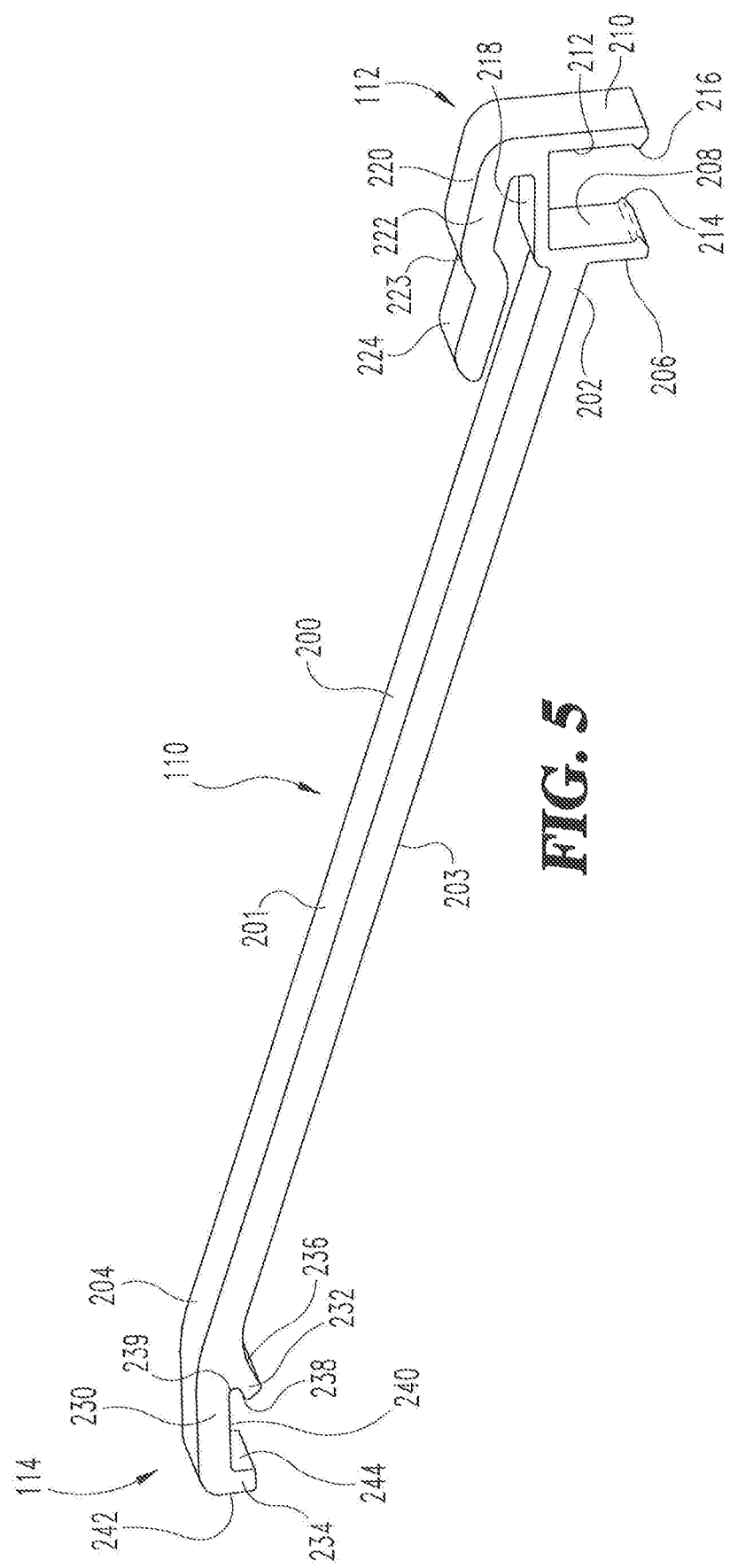
FIG. 5 is a perspective view of a positioning tool.
Figure 6:
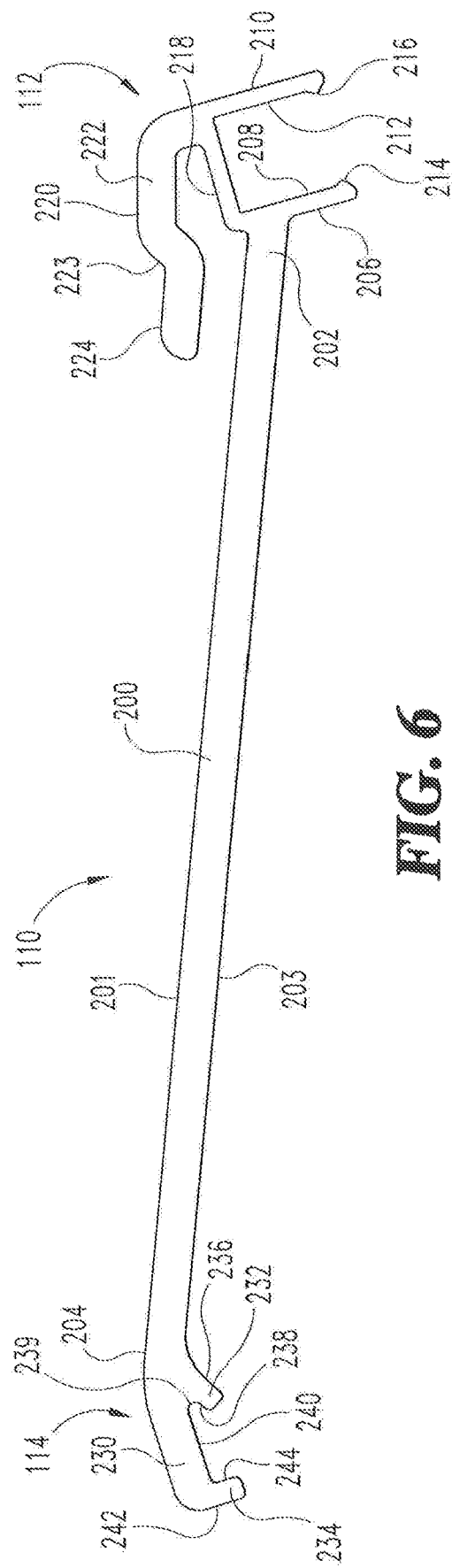
FIG. 6 is a cross-sectional side view of the positioning tool of FIG. 5.

Referring now to FIGS. 5 and 6, a perspective view of the positioning tool 110 and a cross-section side view of the positioning tool 110 are illustrated. The positioning tool 110 can include an elongate rod 200 extending between a first end 202 and a second end 204. The elongate rod 200 can be formed from various cross-sectional shapes including the one depicted which has a square or rectangular cross-section, however other forms may include other shapes to form the elongate rod 200. Also, while the exemplary embodiment illustrates a substantially straight rod 200, some embodiments may require a rod 200 with one or more bends or curves and the like.

A first connector 112 extends from the first end 202 and a second connector 114 extends from the second end 204. The first connector 112 includes a first extension arm 206 extending generally at a 90° or greater angle from the rod 200 as illustrated. The first extension arm 206 includes an inner engagement surface 208 on the inner side thereof. A second extension arm 210 extends generally at a 90° or greater angle from the elongate rod 200 in similar fashion to the first extension arm 206. The second extension arm 210 includes an inner engagement surface 212 on the inner side thereof. The first and second extension arms 206, 210 of the first connector 112 can include a first lip 214 and a second lip 216, respectively, that only extends inward at a distal end of the extension arms 206, 210. The protruding lips 214, 216 provide a clamp or press fit connection about the support rail 22 (not shown). The first connector 112 includes a top wall 218 that extends between the first and second arms 206, 210. A handle 220 may extend from the top wall 218 of the first connector 112. The handle 220 may include a first portion 222 spaced apart from the top wall 218 with an angled transition portion 223 extending from the first portion to a second portion 224 that extends substantially parallel along a partial length of the elongate rod 200. The handle 220 is configured to provide a hand grip to permit one to hold and maneuver the positioning tool 110 while connecting or disconnecting the positioning tool 110 to the vehicle 10. The first and second extension arms 206 and 210 are configured to guide the first connector 112 over a top portion of the support rail 22 (FIGS. 1 and 2) and can clamp around a bottom portion of the support rail 22 with the first and second lips 214, 216. The protruding lips 214, 216 prevent an inadvertent removal of the positioning tool 110 from the support rail 22 due to the interference fit of the lips 214, 216 with the rail 22.

The second connector 114 includes a top wall 230 extending from the second end 204 of the elongate rod 200. A first arm 232 and second arm 234 can extend from the top wall 230. The first arm 232 extends at an acute angle from the top wall 230 toward the second arm 234. The first arm 232 of the second connector 214 can include an outer wall 236 extending from a bottom side 203 of the elongate rod 200. An internal engagement wall 238 can be formed on the other side of the first arm 232. The acute angle of the engagement wall 238 forms an acute locking radius 239 between the top wall 230 and the first arm 232.

The second arm 234 of the second connector 114 includes an outer side wall 242 generally extending orthogonally from an engagement surface 240 of the top wall 230 proximate the bottom side 203 of the rod 200. An engagement surface 244 of the second arm 234 is generally formed in an orthogonal direction from the elongate rod 200. The angle may vary from the orthogonal position in other embodiments. The opposing engagement surfaces 238, 244 of the first and second arms 232, 234 provide a connecting or engagement means for attaching the positioning tool 110 to the seat connector bar 120. In operation the second connector 114 of the positioning tool 110 is attached to the connector bar 120 at an incident angle sufficient to permit the angled first arm 232 to slide around a lower ledge 121 of the connector bar 120 (see FIG. 3). The incident angle of the angled wall 238 permits the first arm 232 of the second connector 114 to slide under the lower ledge 121 of the connector bar 120 when the first connector 112 is held above the support rail 22. The second connector 114 is pivoted or rotated about the connector bar 120 as the first connector 112 is lowered in a substantially vertical direction to clamp down over the support rail 22. The angled engagement wall 238 of the second connector 114 will be removably locked under the lower ledge 121 (see FIG. 3) of the seat connector bar 120 and thus prevent the second connector 114 from being removed from the seat connector bar 120 unless the handle 220 is lifted upward to provide the proper angle for removal of the second connector 114. The positioning tool 110 cannot be inadvertently be removed from the support rail 22 and the seat bottom 32, therefore the seat bottom will remain in a second position until the positioning tool 110 is intentionally disconnected from the support rail 22 and the seat bottom 32.

Figure 7:
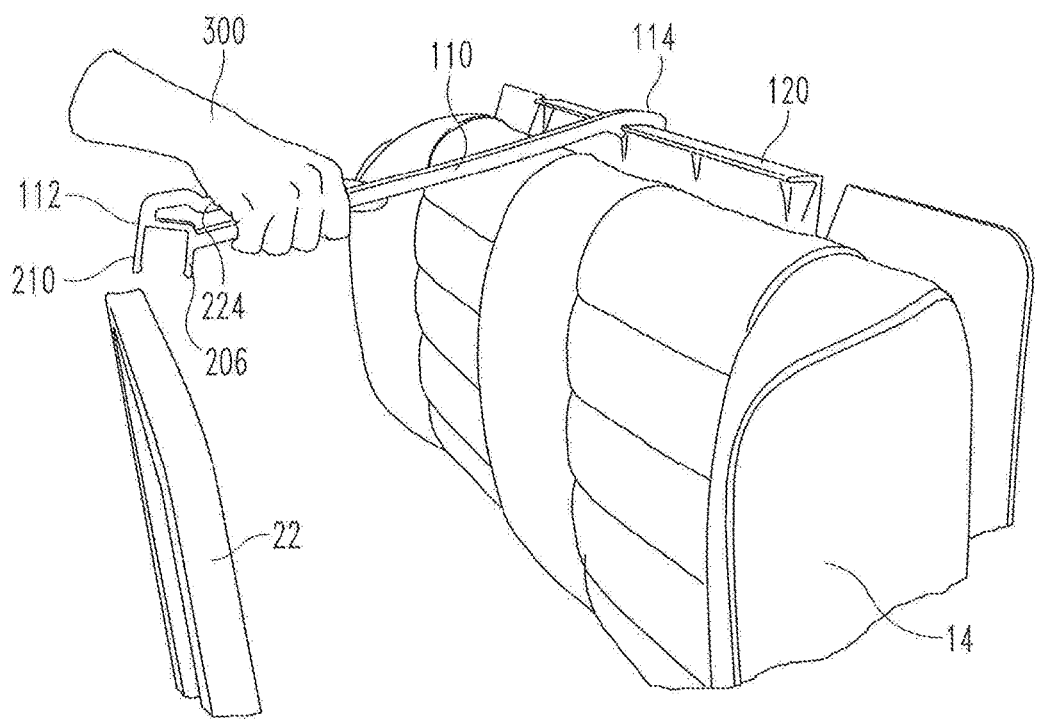
FIGS. 7 and 8 are partial perspective views of the personal utility vehicle with a person using the positioning tool to maneuver and lock/unlock the seat to a support rail.
Figure 8:
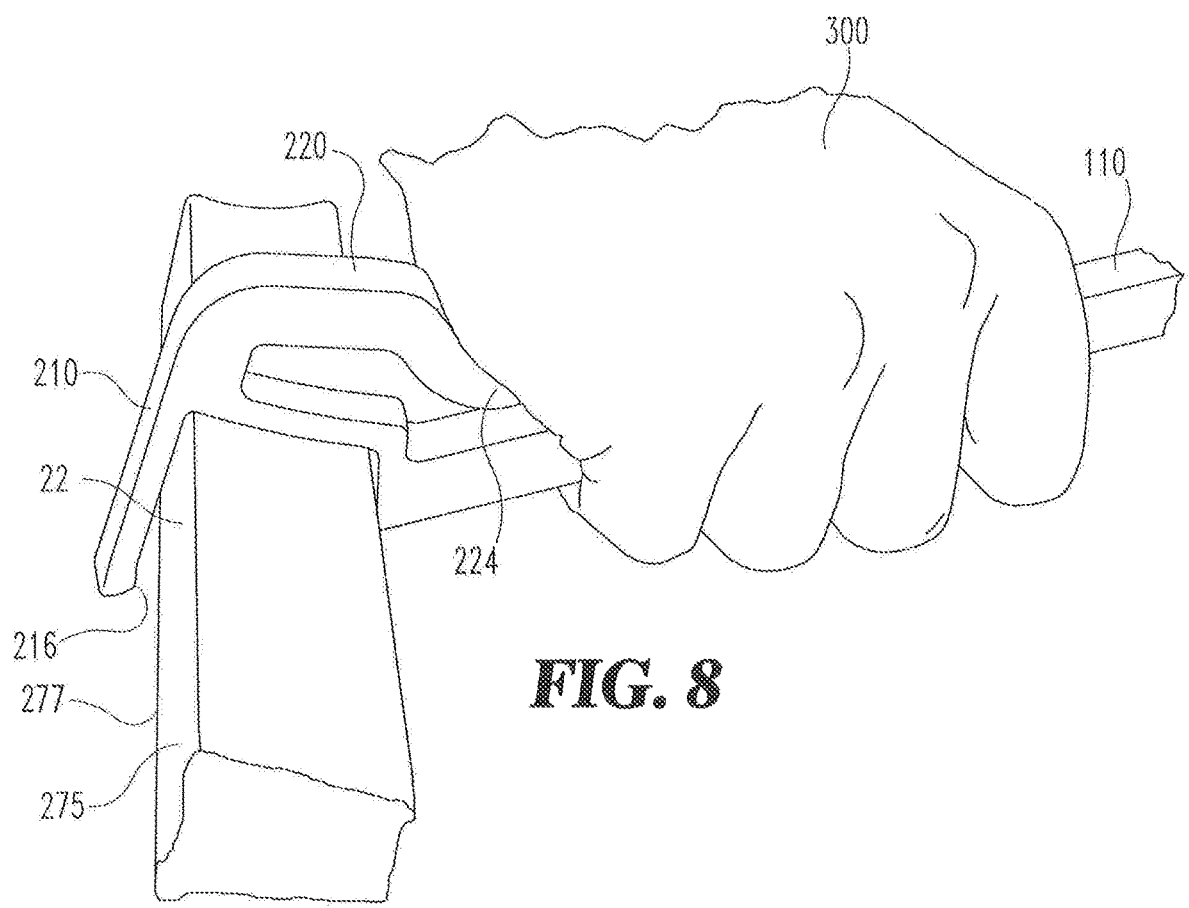

Referring now to FIGS. 7 and 8, the positioning tool 110 can be used to maneuver and lock or unlock the seat 14 to a support rail 22. An operator can grip the positioning tool 110 with one hand 300 and attach the second connector 114 to the seat connector bar 120 and raise or lower the seat 14 when maneuvering the seat between the first position (seating position) and the second position (wall for cargo bay). When the handle 220 is depressed by "squeezing" the second portion 224 (see FIG. 8), the second extension arm 210 deflects apart from the first extension arm 206 at an angle away from an outer sidewall 275 of the support rail 22 as one skilled in the art would readily understand. When the second extension arm 210 is deflected the second lip 216 is displaced such that it can be attached or removed to/from an underside 277 of the support rail 22 depending on whether the seat 14 is being moved to the first or second positions.

In one aspect the present disclosure includes a utility vehicle comprising: a pivotable seat connected by a hinge to a fixed platform, the seat configured to pivot between a first position and a second position, the first position defining a standard seat location and a second position defining a first wall of a cargo bay; a seatback configured to form a second wall of a cargo bay when the pivotable seat is in the second position; and first and second opposing side walls positioned on either side of the pivotable seat, the side walls configured to form side barriers for the cargo bay when the pivotable seat is in the second position.

In refining aspects the pivotable seat includes a seat cushion on a first side and an impact resistant material on a second side; wherein the platform includes an outer surface made from impact resistant material; wherein the side walls are defined by a rail member having an open interior region configured to form an arm rest at opposing ends of the pivotable seat; further comprising a removable panel connected to each of the rail members to form a barrier across the open interior region; wherein the panel includes a plurality of sub-panels; wherein the sub-panels include tongue and groove connectors configured to connect the sub-panels together; further comprising one or more brackets configured to connect the panel to the rail; further comprising a positioning device connectable to a support rail and the pivotable seat, the positioning device configured to hold the pivotable seat in the second position; wherein the positioning device includes an elongate rod having first and second connectors extending from either end; wherein the first connector includes first and second arms projecting in parallel away from the rod, the first and second arms of the first connector being configured to engage with a portion of the support rail and include a lip projecting inward at a distal end of each arm to extend partially across a bottom portion of the support rail; and wherein the second connector includes first and second arms configured to engage with a seat connector bar, wherein at least one of the first and second arms projects away from the rod at an oblique angle.

Another aspect of the present disclosure includes a method for converting a seating area to a cargo bay in a personal transportation vehicle, the method comprising: connecting a seat bottom to a platform via a hinge; pivoting the seat bottom about the hinge such that a bottom wall of the seat bottom is angularly displaced from the platform; forming one wall of the cargo bay with the angularly displaced seat bottom; forming an opposing wall of the cargo bay with the seat back; and forming opposing side walls of the cargo bay with a pair of side restraints connected between the seat bottom and the seat back.

In refining aspects, the method further comprises connecting a panel to each of the side restraints; latching the seat bottom to a fixed member of the vehicle to hold the seat bottom in the angularly displaced position; wherein the latching includes sliding a pair of arms extending from either end of an elongate rod over portions of the fixed member and a seat connector bar.

Another aspect of the present disclosure includes: a chassis having a motive source, a steering mechanism and a plurality of wheels; a seat having a movable seat bottom and a seat back connected to the chassis; a stationary rail extending from the chassis; a cargo bay formed by moving the seat bottom from a substantially horizontal position to a second position, wherein in the second position the seat bottom defines one wall of the cargo bay and the seat back defines an opposing wall of the cargo bay: and first and second side restraints extending between the seat back and the seat bottom along opposing sides of the cargo bay.

In refining aspects, the side restraints include detachable panels structured to form barriers at the first and second sides of the cargo bay; wherein the second position is substantially vertical; further comprising a positioning device connected between the stationary rail and the seat bottom to hold the seat bottom in the second position; wherein the positioning device is defined by an elongate rod having first and second connectors extending from either end thereof, each of the first and second connectors includes a pair of arms spaced apart from one another and configured to engage portions of the stationary rail and a connector bar associated with the seat bottom, respectively.

In another aspect of the present disclosure includes a positioning tool for a positioning a seat on a utility vehicle comprising: an elongate rod having first and second connectors extending from opposing ends thereof; wherein the first connector includes a first pair of arms having first and second lips projecting toward one another at distal ends thereof, the first pair of arms spaced apart from one another and configured to engage portions of a support; wherein the second connector includes a second pair of arms spaced apart from one another and configured to engage portions of the seat, at least one of the second pair of arms extending at an oblique angle from the elongate rod; and a handle attached to the elongate rod proximate the first end, the handle operable to deflect the first pair of arms apart from one another when depressed toward the elongate rod.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:
1. A utility vehicle comprising:
a pivotable seat connected by a hinge to a fixed platform, the seat configured to pivot between a first position and a second position, the first position defining a standard seat location and a second position defining a first wall of a cargo bay;
a seatback configured to form a second wall of a cargo bay when the pivotable seat is in the second position;
first and second opposing side walls positioned on either side of the pivotable seat, the side walls configured to form side barriers for the cargo bay when the pivotable seat is in the second position; and
a removable panel connected to each of the rail members to form a barrier across the open interior region;
wherein the side walls are defined by a rail member having an open interior region configured to form an arm rest at opposing ends of the pivotable seat.
2. The utility vehicle of claim 1, wherein the pivotable seat includes a seat cushion on a first side and an impact resistant material on a second side.

3. The utility vehicle of claim 2, wherein the platform includes an outer surface made from impact resistant material.

4. The utility vehicle of claim 1, wherein the panel includes a plurality of sub-panels.

5. The utility vehicle of claim 4, wherein the sub-panels include tongue and groove connectors configured to connect the sub-panels together.

6. The utility vehicle of claim 1 further comprising one or more brackets configured to connect the panel to the rail.

7. The utility vehicle of claim 1 further comprising a positioning device connectable to a support rail and the pivotable seat, the positioning device configured to hold the pivotable seat in the second position.

8. The utility vehicle of claim 7 wherein the positioning device includes an elongate rod having first and second connectors extending from either end.

9. The utility vehicle of claim 8 wherein the first connector includes first and second arms projecting in parallel away from the rod, the first and second arms of the first connector being configured to engage with a portion of the support rail and include a lip projecting inward at a distal end of each arm to extend partially across a bottom portion of the support rail.

10. The utility vehicle of claim 8 wherein the second connector includes first and second arms configured to engage with a seat connector bar, wherein at least one of the first and second arms projects away from the rod at an oblique angle.

11. A personal utility vehicle comprising:
a chassis having a motive source, a steering mechanism and a plurality of wheels;
a seat having a movable seat bottom and a seat back connected to the chassis;
a stationary rail extending from the chassis;
a cargo bay formed by moving the seat bottom from a substantially horizontal position to a second position, wherein in the second position the seat bottom defines one wall of the cargo bay and the seat back defines an opposing wall of the cargo bay:
first and second side restraints extending between the seat back and the seat bottom along opposing sides of the cargo bay; and
a positioning device connected between the stationary rail and the seat bottom to hold the seat bottom in the second position.

12. The vehicle of claim 11, wherein the side restraints include detachable panels structured to form barriers at the first and second sides of the cargo bay.

13. The vehicle of claim 11, wherein the second position is substantially vertical.

14. The vehicle of claim 11, wherein the positioning device is defined by an elongate rod having first and second connectors extending from either end thereof, each of the first and second connectors includes a pair of arms spaced apart from one another and configured to engage portions of the stationary rail and a connector bar associated with the seat bottom, respectively.

15. A positioning tool for a positioning a seat on a utility vehicle comprising:
an elongate rod having first and second connectors extending from opposing ends thereof;
wherein the first connector includes a first pair of arms having first and second lips projecting toward one another at distal ends thereof, the first pair of arms spaced apart from one another and configured to engage portions of a support;
wherein the second connector includes a second pair of arms spaced apart from one another and configured to engage portions of the seat, at least one of the second pair of arms extending at an oblique angle from the elongate rod; and
a handle attached to the elongate rod proximate the first end, the handle operable to deflect the first pair of arms apart from one another when depressed toward the elongate rod.

* * * * *